United States Patent [19]
Nitz et al.

[11] Patent Number: 5,186,294
[45] Date of Patent: Feb. 16, 1993

[54] CONTROL METHOD FOR THE ENGAGEMENT OF A TORQUE CONVERTER CLUTCH

[75] Inventors: Larry T. Nitz, Troy; Susan L. Rees, Clawson, both of Mich.

[73] Assignee: Saturn Corporation, Troy, Mich.

[21] Appl. No.: 840,246

[22] Filed: Feb. 24, 1992

[51] Int. Cl.$^5$ .................. F16H 61/14; F16H 45/02
[52] U.S. Cl. .................. 192/3.3; 192/3.31; 192/103 F
[58] Field of Search ............ 192/0.032, 3.29, 3.3, 192/3.31, 103 F

[56] References Cited

U.S. PATENT DOCUMENTS

| | | | |
|---|---|---|---|
| 4,706,790 | 11/1987 | Lockhart et al. | 192/3.3 |
| 4,724,939 | 2/1988 | Lockhart et al. | 192/3.3 |
| 4,805,750 | 2/1989 | Nitz | 192/103 F X |
| 4,828,082 | 5/1989 | Brand et al. | 192/3.3 |

FOREIGN PATENT DOCUMENTS

| | | | |
|---|---|---|---|
| 60-256673 | 12/1985 | Japan | 192/3.3 |
| 1-176854 | 7/1989 | Japan | 192/3.3 |
| 2081413 | 2/1982 | United Kingdom | 192/3.31 |
| 2163230 | 2/1986 | United Kingdom | 192/103 F |

*Primary Examiner*—Richard Lorence
*Attorney, Agent, or Firm*—Mark A. Navarre

[57] ABSTRACT

An improved torque converter clutch (TCC) engagement control method utilizing a combination of pressure control and flow control methodologies to ensure consistently smooth and timely TCC engagement. The engagement is initiated with a pressure control methodology in which the duty cycle of a PWM actuator is selected to produce a desired pressure differential across the TCC clutch plate. However, if the flow conditions are such that the pressure control methodology fails to promptly initiate engagement of the TCC, as detected in relation to the speed difference across the torque converter, a flow control methodology is substituted for the pressure control to initiate clutch engagement. In this case, the duty cycle of the actuator is adjusted to a value which provides full or near-full fluid flow. This control is maintained for a predetermined period, or until the speed difference across the torque converter indicates initiation of TCC engagement. At such point, the pressure control methodology is resumed to complete the TCC engagement.

6 Claims, 8 Drawing Sheets

CONTROL METHOD FOR THE ENGAGEMENT OF A TORQUE CONVERTER CLUTCH

This invention is directed to the engagement of a torque converter clutch in a motor vehicle transmission, and more particularly, to a control method which achieves consistent operation despite vehicle variability.

BACKGROUND OF THE INVENTION

In a typical motor vehicle powertrain, the engine is connected to an automatic transmission and drive axle through a fluid coupling, such as a torque converter. A clutch internal to the torque converter (referred to herein as a torque converter clutch or TCC) is selectively engageable to control or eliminate slippage between the torque converter input (impeller) and output (turbine). The TCC comprises a plate connected to rotate with the turbine in proximity to a rotary housing (input shell) of the torque converter.

When fluid is supplied to the torque converter at a point between the clutch plate and the input shell (release chamber), the fluid flows around the plate before being exhausted to an oil cooler, thereby biasing the clutch plate away from the input shell for normal (open) converter operation. When the fluid supply connections are altered to reduce the fluid pressure in the release chamber relative to the pressure on the other side of the clutch plate (apply chamber), the pressure differential across the clutch plate moves the clutch plate toward the input shell, bringing a friction pad formed on the clutch plate into contact with the input shell, engaging the TCC.

Under most conditions, smooth engagement and torque capacity control of the TCC can be achieved through a combination of open-loop and closed-loop control of the pressure differential across the clutch plate. Under certain conditions, however, the fluid flow around the clutch plate approaches the flow of the actuator, and the desired pressure differential is not achieved. In this case, TCC engagement does not occur until the flow condition is corrected. Even if closed-loop pressure controls are employed to augment the pressure differential, the TCC engagement is not initiated in a timely manner, and there may be undesired driveline torque disturbances when the engagement eventually occurs.

SUMMARY OF THE PRESENT INVENTION

The present invention is directed to an improved TCC engagement control method utilizing a combination of pressure control and flow control methodologies to ensure consistently smooth and timely TCC engagement.

The engagement of the TCC is carried out with a pulse width modulated (PWM) actuator adapted to controllably relieve the fluid pressure in the release chamber of the torque converter. The engagement is initiated with a pressure control methodology in which the duty cycle of the PWM actuator is selected to produce a desired pressure differential across the clutch plate. The duty cycle command is determined in accordance with a predetermined open-loop schedule based on input torque and time of apply. In the preferred embodiment, a closed-loop pressure modifier based on the rate of change in speed across the torque converter is combined with the open-loop command in order to ensure the development of a sufficient pressure differential despite varying operating conditions.

However, if the flow conditions are such that the pressure control methodology fails to promptly initiate engagement of the TCC, as detected in relation to the speed difference across the torque converter, a flow control methodology is substituted for the pressure control to initiate clutch engagement. In this case, the PWM duty cycle of the actuator is adjusted to a value which provides full or near-full fluid flow. This control is maintained for a predetermined period, or until the speed difference across the torque converter indicates actual initiation of TCC engagement. At such point, the pressure control methodology is resumed to complete the TCC engagement.

The above-described combination of pressure and flow control methodologies ensures a timely initiation of TCC engagement, while achieving good regulation of the TCC torque capacity once engagement of the clutch has been initiated. As a result, flow related delays in TCC engagement and resulting driveline torque disturbances are avoided.

DETAILED DESCRIPTION OF THE DRAWINGS

Figure 1A:
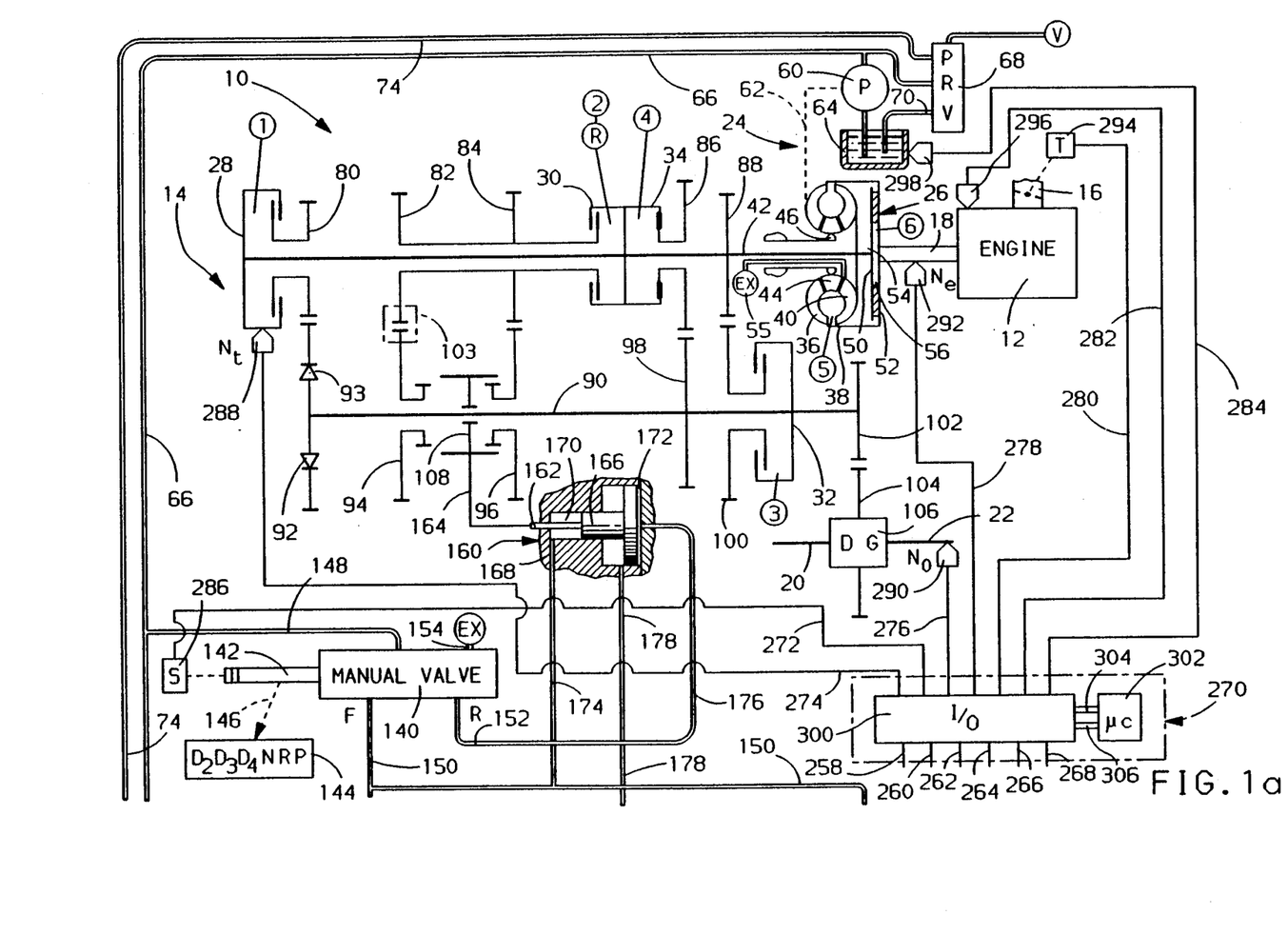
FIGS. 1a–1b schematically depict a computer-based electronic transmission control system according to this invention.
Figure 1B:
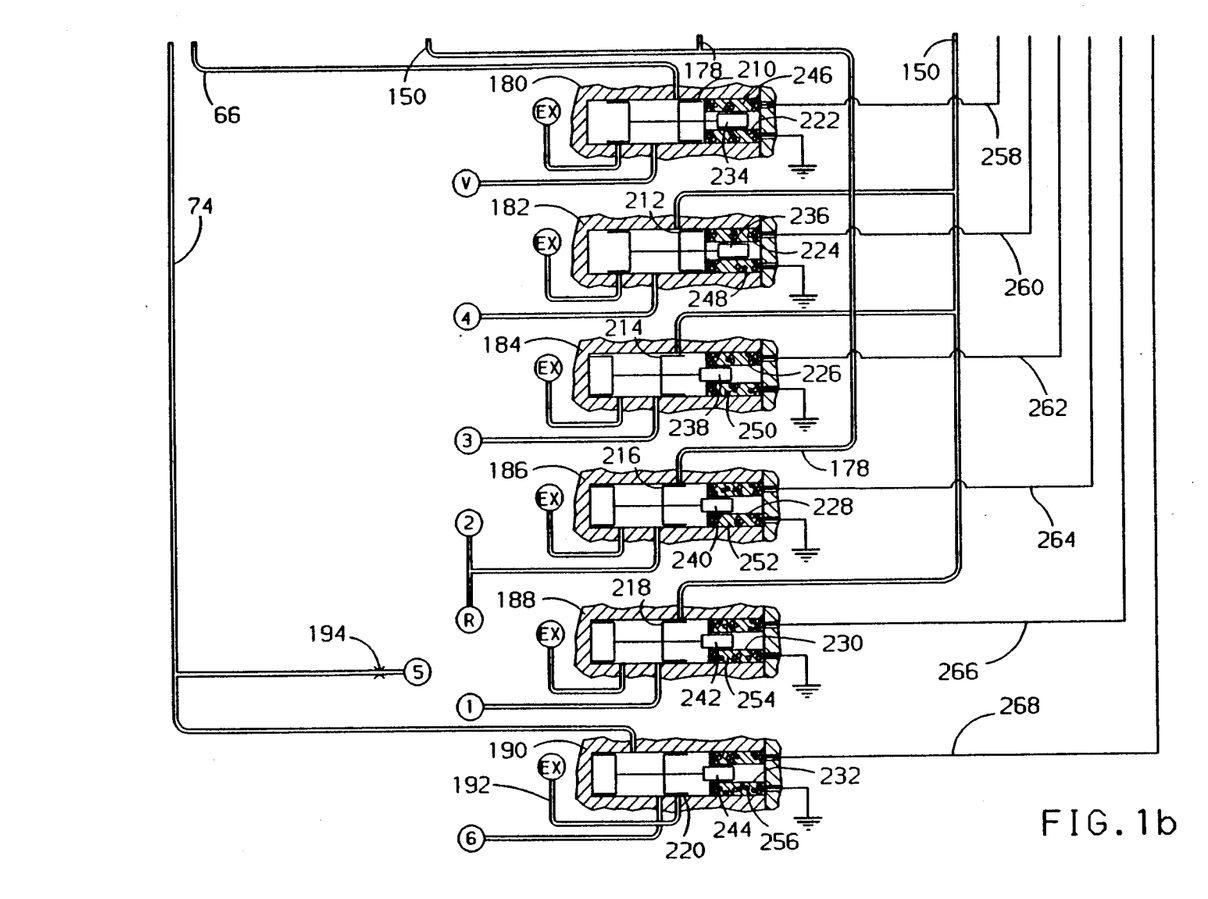

Referring particularly to FIGS. 1a and 1b, the reference numeral 10 generally designates a motor vehicle drivetrain including an engine 12 and a parallel shaft transmission 14 having a reverse speed ratio and four forward speed ratios. Engine 12 includes a throttle mechanism 16 mechanically connected to an operator manipulated device, such as an accelerator pedal (not shown) for regulating engine output torque, such torque being applied to the transmission 14 through the engine output shaft 18. The transmission 14 transmits engine output torque to a pair of drive axles 20 and 22 through a torque converter 24 and one or more of the fluid operated clutching devices 26–34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14.

The torque converter 24 also includes a clutching device 26, also referred to herein as the torque converter clutch or TCC, comprising a clutch plate 50 connected to rotate with the turbine 40. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38 as shown in FIG. 1, thereby engaging the TCC 26 to provide a mechanical drive connection in parallel with the torque converter 24. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56. A fluid exhaust line 55 returns fluid from the torque converter 24 to a cooler (not shown).

A positive displacement hydraulic pump 60 is mechanically driven by the engine output shaft 18 through the input shell 38 and impeller 36, as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in U.S. Pat. No. 4,342,545 to Schuster issued Aug. 3, 1982, and a representative pressure regulator valve is disclosed in U.S. Pat. No. 4,283,970 to Vukovich issued Aug. 18, 1981, such patents being assigned to the assignee of the present invention.

The transmission shaft 42 and a further transmission shaft 90 each have a plurality of gear elements rotatably supported thereon. The gear elements 80-88 are supported on shaft 42 and the gear elements 92-102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28–34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28–34 is biased toward a disengaged state by a return spring (not shown).

Engagement of the clutching device is effected by supplying fluid pressure to an apply chamber thereof. The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80–88 and 92–100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28–34 in a released condition. The speed ratios defined by the various gear element pairs are generally characterized by the ratio of the turbine speed $N_t$ to output speed $N_o$. Representative $N_t/N_o$ ratios for transmission 14 are as follows:

| | |
|---|---|
| First - 2.368 | Second - 1.273 |
| Third - 0.808 | Fourth - 0.585 |
| Reverse - 1.880 | |

The fluid control elements of the transmission 14 include a manual valve 140, a directional servo 160 and a plurality of electrically operated fluid valves 180–190. The manual valve 140 operates in response to operator demand and serves, in conjunction with directional servo 160, to direct regulated line pressure to the appropriate fluid valves 182–188. The fluid valves 182–188, in turn, are individually controlled to direct fluid pressure to the clutching devices 28–34. The fluid valve 180 is controlled to direct fluid pressure from the pump output line 66 to the pressure regulator valve 68. The fluid valve 190 is controlled to direct fluid pressure from the PRV output line 74 to TCC 26. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148, and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3 or D2 positions shown on the indicator mechanism 144, line pressure from the line 148 is directed to the forward (F) output line 150.

When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1a to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180-190 each receive fluid pressure at an input passage thereof from the pump 60 or PRV 68, and are individually controlled to direct fluid pressure to the pressure regulator valve 68 or respective clutching devices 26-34. The fluid valve 180 receives line pressure directly from pump output line 66, and is controlled to direct a variable amount of such pressure to the pressure regulator valve 68, as indicated by the circled letter V. The fluid valves 182, 184 and 188 receive fluid pressure from the forward output line 150 of manual valve 140, and are controlled to direct variable amounts of such pressure to the clutching devices 34, 32 and 28, as indicated by the circled numerals 4, 3 and 1, respectively. The fluid valve 186 receives fluid pressure from the directional servo output line 178, and is controlled to direct a variable amount of such pressure to the clutching device 30, as indicated by the circled numeral 2 and the circled letter R.

The fluid valve 190 is adapted to alternately connect the release chamber 56 of torque converter 24 to fluid pressure line 74 and exhaust line 192, as indicated by the circled numeral 6. The apply chamber 54 of TCC 26 is supplied with fluid pressure from the fluid pressure line 74 via the orifice 194, as indicated by the circled numeral 5.

Each of the fluid valves 180-190 includes a spool element 210-220, axially movable within the respective valve body for directing fluid flow between input and output passages. When a respective spool element 210-220 is in the rightmost position as viewed in FIG. 1b, the input and output passages are connected. Each of the fluid valves 180-190 includes an exhaust passage, as indicated by the circled letters EX, such passage serving to drain fluid from the respective clutching device when the spool element is shifted to the leftmost position as viewed in FIG. 1b. In FIG. 1b, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines.

Each of the fluid valves 180-190 includes a solenoid 222-232 for controlling the position of its spool element 210-220. Each such solenoid 222-232 comprises a plunger 234-244 connected to the respective spool element 210-220 and a solenoid coil 246-256 is surrounding the respective plunger. One terminal of each such solenoid coil 246-256 is connected to ground potential as shown, and the other terminal is connected to an output line 258-268 of a control unit 270 which governs the solenoid coil energization. As set forth hereinafter, the control unit 270 pulse width modulates the solenoid coils 246-256 according to a predetermined control algorithm to regulate the fluid pressure supplied to the pressure regulator 68 and the clutching devices 26-34, the duty cycle of such modulation being determined in relation to the desired magnitude of the supplied pressures.

With respect to the TCC 26, open converter operation is achieved by deenergizing the coil 256 of fluid valve 190 so that the spool element 220 assumes the position depicted in FIG. 1b. In this case, the fluid pressure in line 74 is directed to the release chamber 56 of torque converter 24, creating a pressure differential across clutch plate 50 which disables engagement of TCC 26. The fluid supplied to release chamber 56 via valve 190 and the fluid supplied to apply chamber 54 via orifice 194 are both exhausted via exhaust line 55 of FIG. 1a.

When it is desired to engage the TCC 26, the coil 256 of valve 190 is pulse width modulated to lessen the fluid pressure in the release chamber 56 of torque converter 24. This creates a pressure differential across clutch plate 50 which moves the friction element 52 into engagement with input shell 38 to initiate TCC engagement. As explained below, the PWM duty cycle of valve 190 is selected to promptly initiate engagement of TCC 26, and thereafter to progressively increase its torque capacity to a desired level.

While the fluid valves 180-190 have been illustrated as spool valves, other types of valves could be substituted therefor. By way of example, valves of the ball and seat type could be used. In general terms, the fluid valves 180-190 may be mechanized with any three-port pulse width modulated valving arrangement.

Input signals for the control unit 270 are provided on the input lines 272-285. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$.

The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

The control unit 270 responds to the input signals on input lines 272-285 according to a predetermined control algorithm as set forth herein, for controlling the energization of the fluid valve solenoid coils 246-256 via output lines 258-268. As such, the control unit 270 includes an input/output (I/0) device 300 for receiving the input signals and outputting the various pulse width modulation signals, and a microcomputer 302 which communicates with the I/0 device 300 via an address-and-control bus 304 and a bi-directional data bus 306. Flow diagrams representing suitable program instructions for developing the pulse width modulation output for fluid valve 190 in accordance with the teachings of this invention are depicted in FIGS. 3-6.

As indicated above, the present invention is directed to a TCC engagement control utilizing both pressure and flow control methodologies. The TCC engagement is initiated with a pressure control methodology designed to develop a desired pressure differential with respect to time. Under most conditions, the desired profile is actually achieved, and the clutch friction element 52 is successfully biased into engagement with input shell 38, whereafter the torque capacity of the TCC 26 varies in direct relation to the developed pressure differential. In this event, the pressure control methodology is used exclusively during TCC engagement.

However, if the initial fluid flow around clutch plate 50 approaches the flow rate of fluid valve 190 (at the given duty cycle), the desired pressure differential may not be achieved, delaying the initiation of clutch engagement until conditions change. This condition is detected, according to this invention, by monitoring the speed difference SDTC across the torque converter (that is, $Ne-Nt$), and the rate of change of SDTC. If SDTC is larger than a threshold value K and the rate of change of SDTC is not sufficiently negative, the pressure control methodology is suspended in favor of a flow control methodology. In this case, the PWM duty cycle of fluid valve 190 is adjusted to a value which provides full or near-full fluid flow. The flow control is maintained for a predetermined period, or until a given change in the speed difference SDTC occurs, indicating initiation of TCC engagement. At such point, the pressure control methodology is resumed to complete the TCC engagement.

Figure 2:
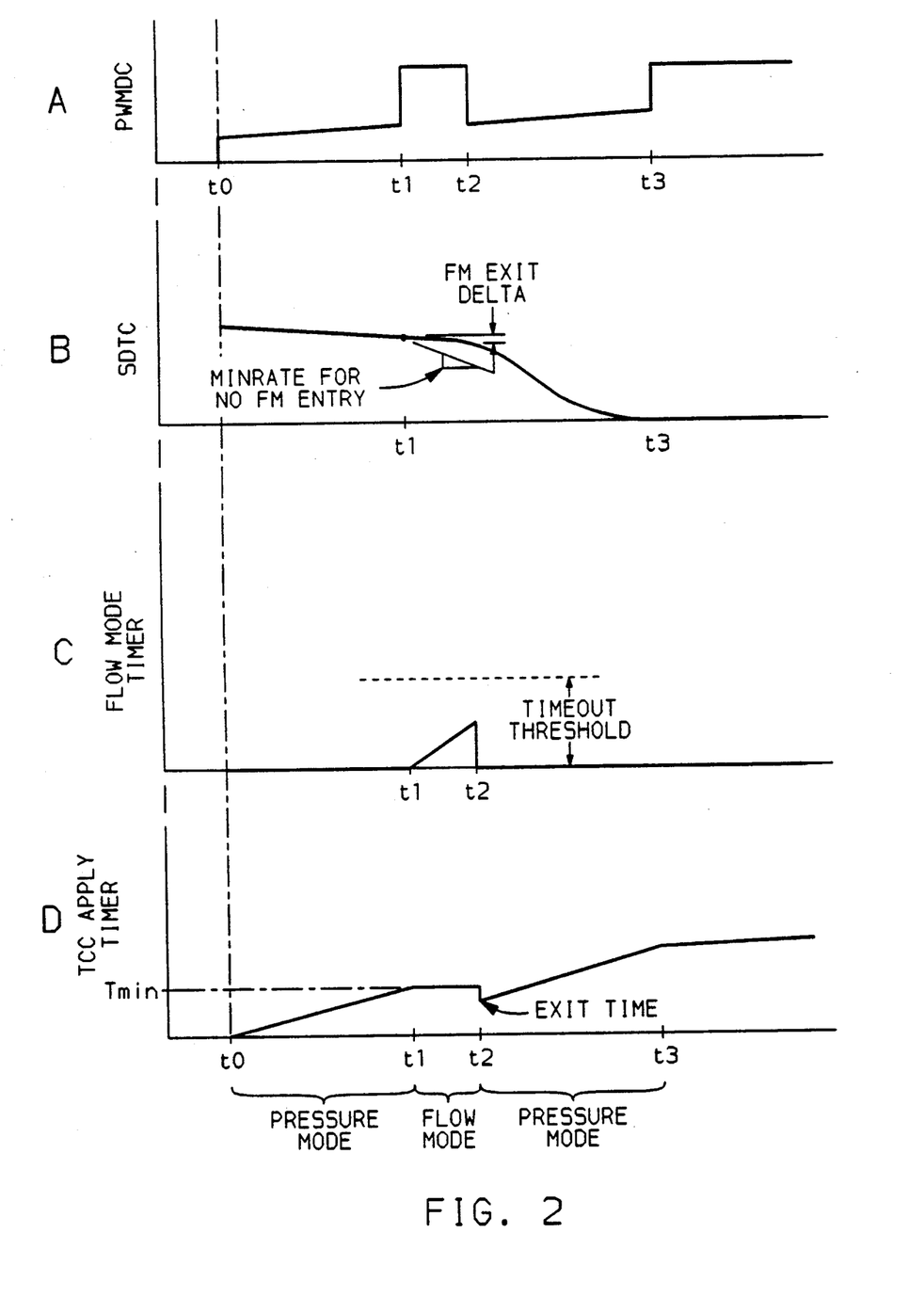
FIGS. 2A–2D graphically depicts various transmission and control, parameters occurring in the course of a TCC engagement according to this invention.

The control method according to this invention is graphically depicted in FIG. 2, where the PWM duty cycle PWMDC, the speed difference across the torque converter SDTC, and a pair of timer values are shown in Graphs A-D on a common time base for a representative TCC engagement. The timer value depicted in Graph D, designated herein as TCC APPLY TIMER, represents elapsed time beginning with the initiation of the pressure control mode. The time value depicted in Graph C, designated herein as FLOWMODE TIMER, represents the elapsed time in the flow control mode.

The engagement of TCC 26 is initiated at time t0, as marked by the PWM duty cycle PWMDC in Graph A. The pressure differential is achieved by modulating the fluid valve 190 at a duty cycle determined in relation to input torque Tin, the value of TCC APPLY TIMER, and an estimation of the fluid pressure in apply chamber 54. In addition to this open-loop control, the PWM duty cycle is subject to closed-loop adjustment in relation to the deviation, if any, between the actual rate of change of SDTC and a reference rate of change.

If, after a minimum pressure control time interval Tmin (Graph D), the SDTC and d(SDTC)/dt values indicate that clutch engagement has not commenced—that is, SDTC>REF and d(SDTC)/dt>MIN-RATE—the flow control methodology is initiated in place of the pressure control methodology. This condition occurs at time t1 in FIG. 2. Thus, the PWM duty cycle of fluid valve 190 is increased at once (Graph A) to provide maximum flow out of release chamber 56, and the FLOWMODE TIMER (Graph C) is started. In practice, the flow mode duty cycle is chosen in relation to the input torque Tin. Once the flow control methodology is initiated, the increased flow out of release chamber 56 creates a substantial increase in the pressure differential DP, causing the clutch plate friction pad 52 to move into engagement with input shell 38, initiating engagement of TCC 26. This condition is sensed by comparing the current value of SDTC with the value of SDTC observed at the commencement of the flow mode—that is, at time t1.

When the difference between the two SDTC values exceeds a threshold (FM EXIT DELTA), or a calibrated flowmode time interval (TIMEOUT THRESHOLD) elapses, the pressure control methodology is resumed. In the illustrated example, this condition occurs at time t2. At this point, the TCC APPLY TIMER is reset (Graph D) to a predetermined time, designated EXIT TIME in Graph D, and the FLOWMODE TIMER is reset to zero (Graph C). The PWM duty cycle (Graph A) at this point is determined as a function of torque Tin and the TCC TIMER, as described above in reference to the pressure mode. Thereafter, the pressure control methodology is maintained until the TCC 26 is fully engaged (Graph B) at time t3, whereupon the PWM duty cycle of fluid valve 190 (Graph A) is increased to 100% (full on).

Figure 3:
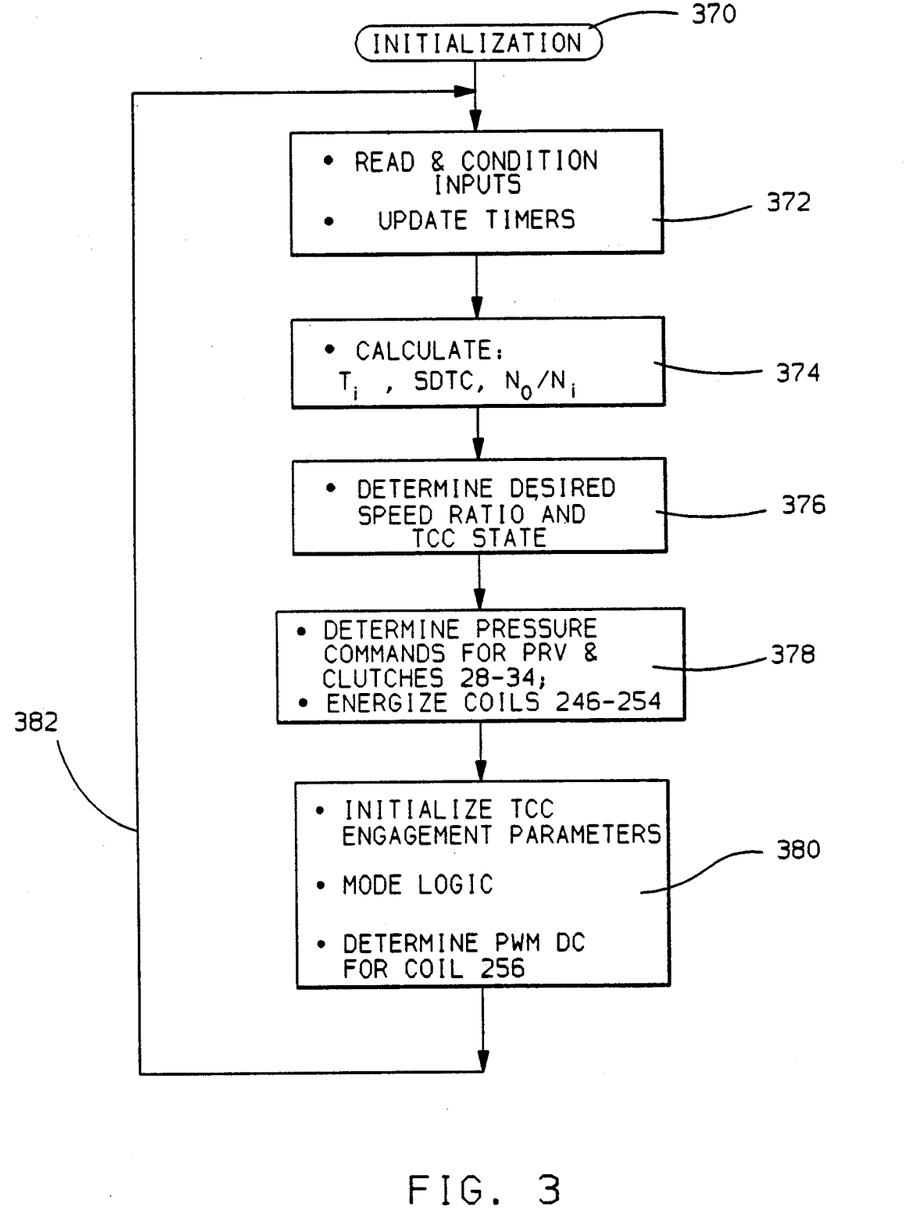
FIGS. 3, 4, 5, 6A and 6B depict flow diagrams executed by the computer-based controller of FIG. 1a in carrying out the control of this invention.
Figure 4:
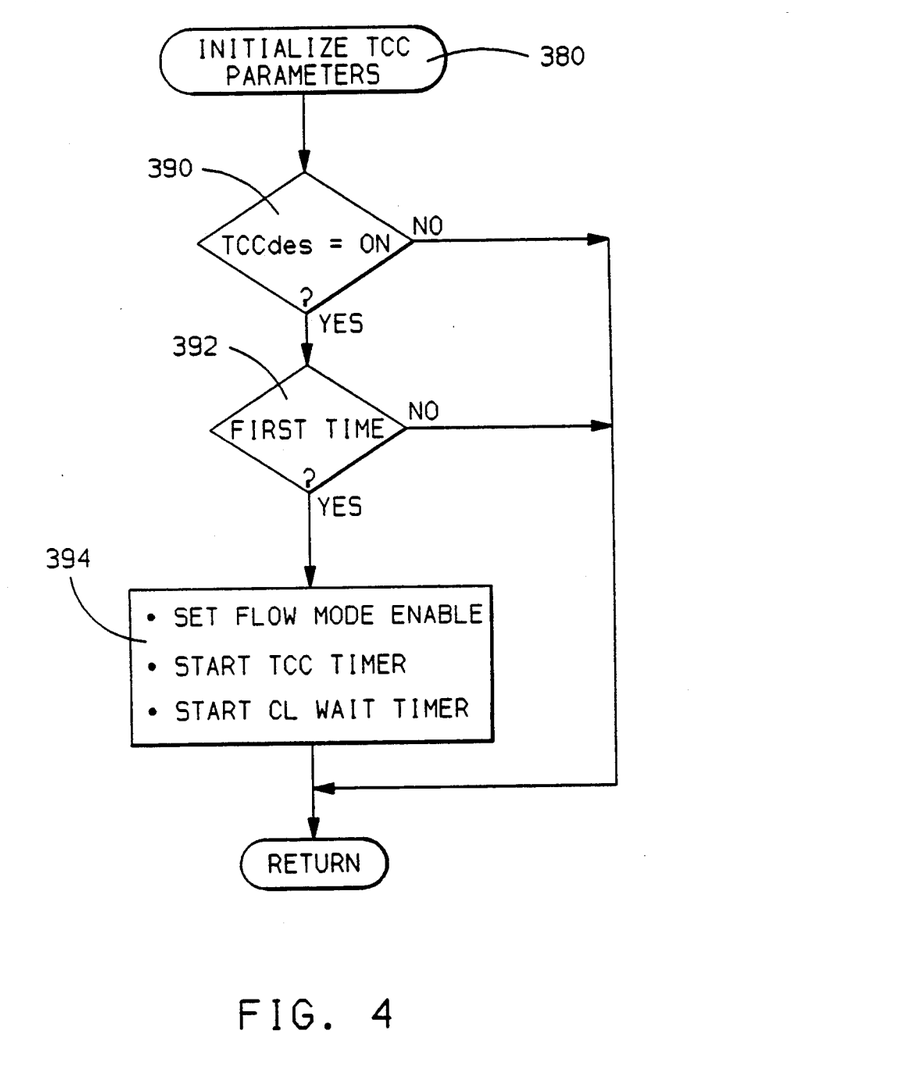
Figure 5:
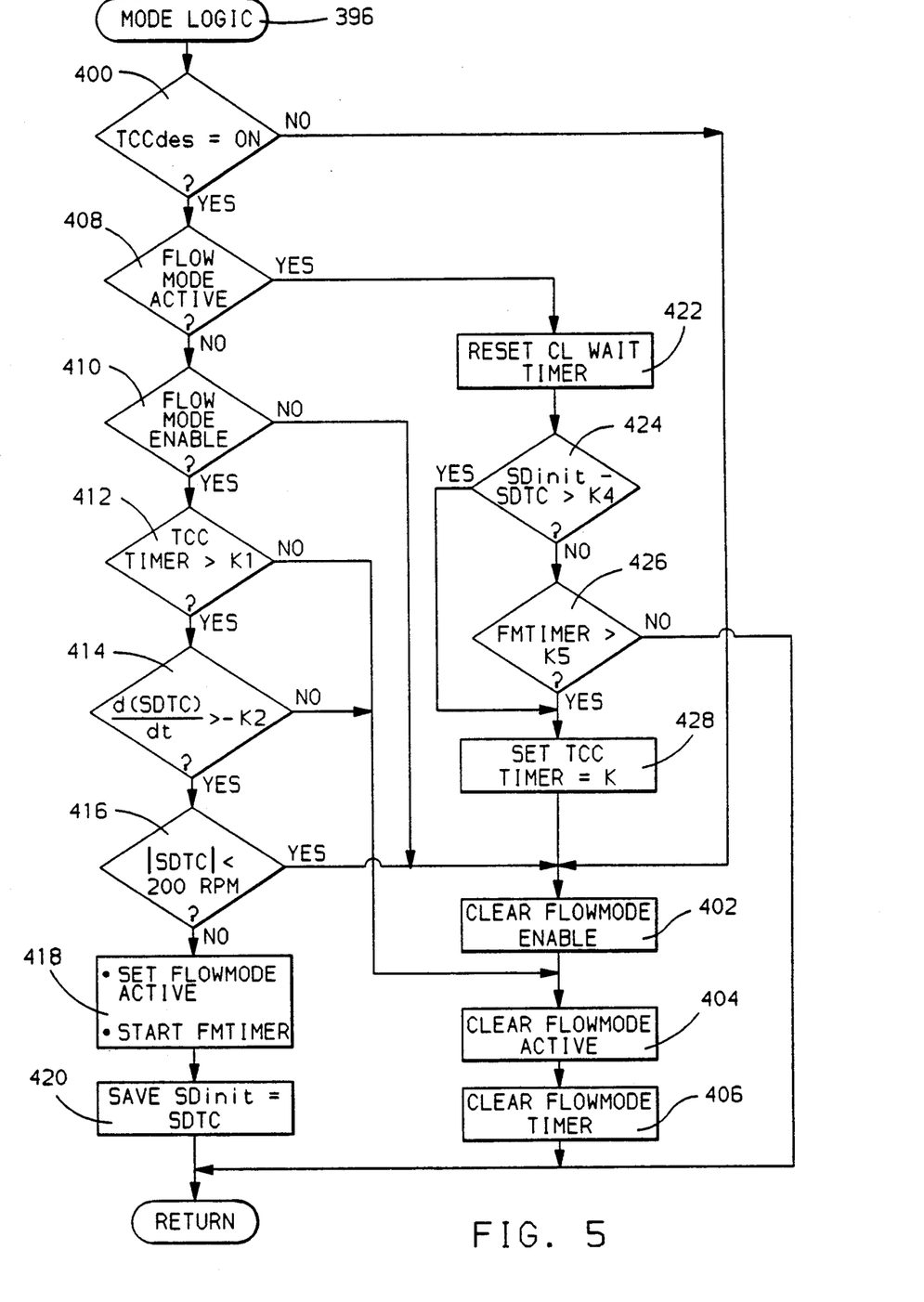
Figure 6A:
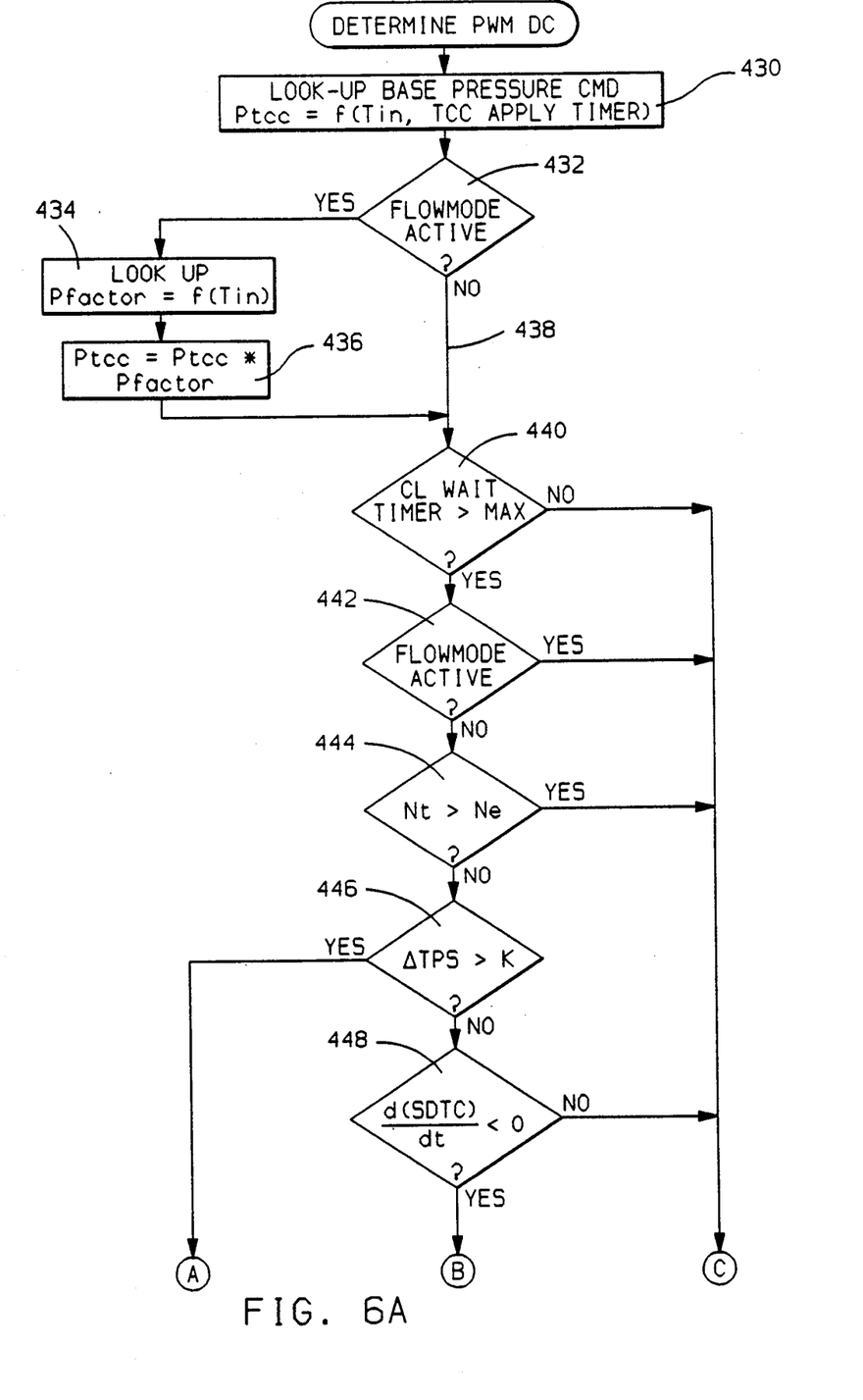
Figure 6B:
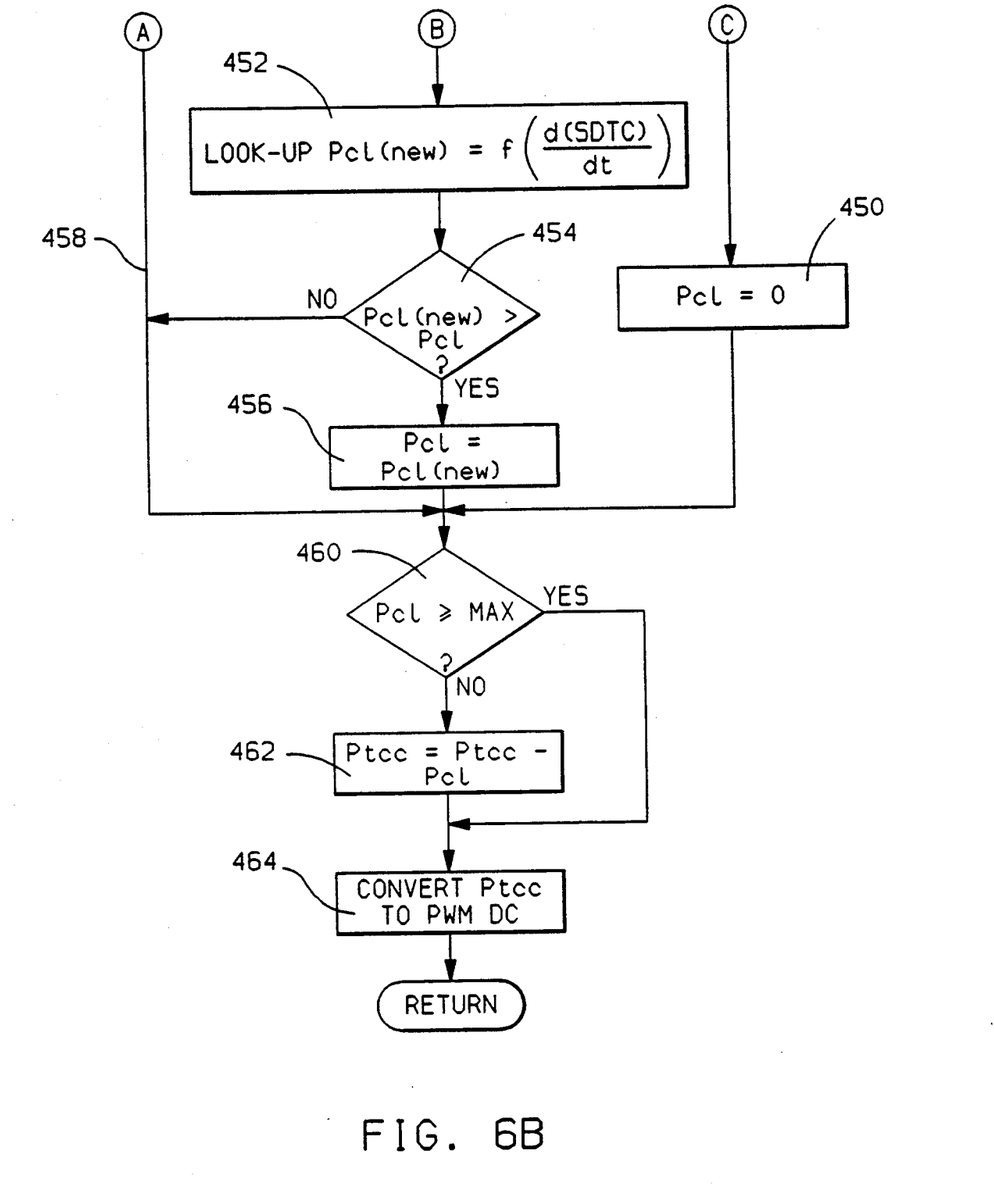

The flow diagrams depicted in FIGS. 3-6 represent program instructions to be executed by the microcomputer 302 of control unit 270 in mechanizing ratio shifting and the adaptive control functions of this invention. The flow diagram of FIG. 3 represents a main or executive program which calls various subroutines for executing particular control functions as necessary. The flow diagrams of FIGS. 4-6 represent the functions performed by those subroutines which are pertinent to the present invention.

Referring now more particularly to FIG. 3, the reference numeral 370 designates a set of program instructions executed at the initiation of each period of vehicle operation for initializing the various tables, timers, etc., used in carrying out the control functions of this invention. Following such initialization, the instruction blocks 372-380 are repeatedly executed in sequence, as designated by the flow diagram lines connecting such instruction blocks and the return line 382. Instruction block 372 reads and conditions the various input signals applied to I/O device 300 via the lines 272-28, and updates (increments) the various control unit timers. Instruction block 374 calculates various terms used in the control algorithms, including the input torque $T_i$, the speed difference SDTC and the speed ratio $N_o/N_i$. Instruction block 376 determines the desired speed ratio and TCC state in accordance with a number of inputs including throttle position, vehicle speed, and manual valve position. Instruction block 378 determines the pressure commands for the various clutching devices 28-34, and energizes the solenoid coils 246-254 accordingly. The instruction block 380 initializes the TCC engagement parameters, determines the appropriate control methodology (pressure or flow) and determines the PWM duty cycle for fluid valve 190.

An expanded description of the initializing portion of instruction block 380 is set forth below in reference to the flow diagram of FIG. 4. Referring to FIG. 4, the decision block 390 is first executed to determine if TCC engagement is desired, as indicated by the state of the term TCCdes. As indicated above, the state of this term is determined at block 376 of the main flow diagram, based on parameters such as vehicle speed, throttle position, coolant temperature, and service brake application. When the state of TCCdes transitions from OFF to ON, as determined at block 392, the block 394 is executed to set the FLOW MODE ENABLE flag, to start the TCC TIMER and to start the CL WAIT TIMER.

An expanded description of the MODE LOGIC portion of instruction block 380 is set forth below in reference to the flow diagram of FIG. 5. Referring to FIG. 5, the decision block 400 is first executed to determine if the state of the term TCCdes is ON. If not, the blocks 402-406 are executed to clear the FLOWMODE ENABLE flag, to clear the FLOWMODE ACTIVE flag, and to clear the FLOWMODE TIMER. The setting of the TCC TIMER value in this condition is inconsequential since TCC engagement is not desired.

If TCCdes is ON, the flow control methodology is enabled but not active, and a predetermined time has elapsed since the start of the TCC engagement (as determined at blocks 408-412), the blocks 414-416 are executed to determine if the pressure control methodology is actually initiating TCC engagement. Specifically, the pressure control methodology is deemed to be inadequate if (1) the rate of change d(SDTC)/dt of the speed difference across the torque converter SDTC is less negative than a reference K2 (block 414), and (2) the magnitude of the speed difference across the torque converter |SDTC| is greater than a reference speed such as 200 RPM (block 416). In this case, the blocks 418 and 420 are executed to initiate the flow control mode by setting the FLOWMODE ACTIVE flag, starting the FLOWMODE TIMER, and saving the current value of SDTC in the initial speed difference term, SDinit.

If the speed difference rate of change condition defined by block 414 indicates that the TCC engagement is progressing, the blocks 404 and 406 are executed, as described above, to clear the FLOWMODE ACTIVE flag and to clear the FLOWMODE TIMER. Even if the speed difference rate of change is less negative that the reference K2, the blocks 402-406 are executed to clear the FLOWMODE ENABLE and FLOWMODE ACTIVE flags and to clear the FLOWMODE TIMER so long as the magnitude of the speed difference across the torque converter |SDTC| is less than 200 RPM, as determined at block 416.

So long as the flow control methodology is activated (FLOWMODE ACTIVE flag set), the blocks 422-424 are executed to reset the closed-loop wait timer (CL WAIT TIMER) and to determine if the current speed difference SDTC has been reduced by at least a predetermined amount K4. If the speed difference reduction is satisfied, the initiation of TCC engagement is indicated, and the blocks 428 and 402-406 are executed to set the TCC TIMER to a predetermined value K, to clear the FLOWMODE ENABLE and FLOWMODE ACTIVE flags and to clear the FLOWMODE TIMER. This cancels the flow control methodology so that the pressure control methodology may be resumed. This action is also taken if the flow control mode has been in effect for more than a reference time interval K5, as determined at block 426.

An expanded description of the DETERMINE PWM DC portion of instruction block 380 is set forth below in reference to the flow diagram of FIG. 6. Referring to FIG. 6, the block 430 is first executed to look-up the base TCC pressure Ptcc as a function of the input torque Tin, and the elapsed time of engagement, as denoted by the TCC TIMER. If the flow control mode is active, as determined at block 432, the blocks 434-436 are executed to look-up a pressure factor Pfactor in relation to the input torque Tin and to apply the pressure factor to the base pressure term Ptcc. If the pressure mode is active, the execution of blocks 434-436 is skipped, as indicated by flow diagram line 438.

In either control mode, the blocks 440-448 are then executed to determine if closed-loop adjustment of the base pressure command Ptcc is enabled. Specifically, closed-loop adjustment is disabled if (1) the CL WAIT TIMER is less than a reference time MAX, (2) the FLOWMODE ACTIVE flag is set, (3) the turbine speed $N_t$ is greater than the engine speed Ne, or (4) the change in TPS is less than K and the rate of change in speed difference SDTC indicates TCC engagement progression. If any of these conditions are met, the block 450 is executed to set the current closed-loop pressure term Pcl to zero.

If the closed-loop enable conditions are met, and there is no substantial change in engine throttle position (as determined at block 446), the block 452 is executed to look-up a new closed-loop value Pcl(new) as a function of the rate of change in the speed difference SDTC. If Pcl(new) exceeds the current closed-loop term Pcl (as determined at block 454), the block 456 is executed to update Pcl. If there is a substantial change in engine throttle position (TPS), the execution of blocks 448-456 is indicated by flow diagram line 458. In any event, the blocks 460-464 are then executed to update the pressure command Ptcc in accordance with the closed-loop adjustment Pcl, if any, and to convert the pressure command to a PWM duty cycle (DC) for the solenoid coil 256 of fluid valve 190.

A working description of a TCC engagement according to this invention is now given. References to flow diagram blocks will be indicated by the designation <nn>, where nn is the reference numeral assigned to the block.

When TCC engagement is desired, the pressure control methodology is activated, meaning that the PWM duty cycle of fluid valve 190 is selected <430> in open-loop fashion (initially) to achieve a desired and progressively increasing pressure differential across the TCC clutch plate 50. As described above, the fluid valve effects the pressure differential by progressively releasing the pressure in release chamber 56. After a specified interval <440>, the open-loop pressure control is subject to closed-loop adjustment <462> for the purpose of maintaining a given rate of change in the speed differential SDTC <452>.

If the pressure control methodology is not effective to actually initiate TCC engagement within a given amount of time <412-414>, the pressure control is suspended and a flow control methodology activated <418> to increase the fluid flow across TCC clutch plate 50 for the purpose of initiating TCC engagement. In this case, the PWM duty cycle output is increased (as a function of input torque) to provide full or near-full flow through the fluid valve 190 <432-436>, and closed-loop adjustment is suspended <442, 450>.

When a given reduction in the speed differential SDTC is observed <424> or a predetermined interval of time has elapsed <426>, the pressure control methodology is re-instituted <402-406>. At this point, the TCC TIMER value used to schedule the base pressure command Ptcc is reset to a predetermined value <428>, and the CL WAIT TIMER is reset <422> as in the initial pressure mode control. The pressure control then smoothly completes the TCC engagement in a timely manner.

While this invention has been described in reference to the illustrated embodiment, various modifications will occur to those skilled in the art, and it should be understood that control methodologies incorporating such modifications may fall within the scope of this invention, which is defined by the appended claims.

The embodiments of the invention in which an exclusive property or privilege is claimed are defined as follows:

1. In a motor vehicle in which torque developed by an engine is transmitted to a drive axle through a fluid coupling and transmission, the fluid coupling having a TCC defined by a clutch plate adapted to engage a rotary element of said fluid coupling to establish a mechanical drive connection between the engine and transmission, the transmission including a solenoid operated fluid control valve alternately actuable to supply fluid pressure to and exhausting fluid pressure from a release chamber defined by an area between said clutch plate and said rotary element for regulating the engagement of said clutch plate with said rotary element, a control method for initiating and completing engagement of said clutch plate, comprising the steps of:

establishing a pressure control mode when a signal commanding engagement of the TCC is produced, wherein said solenoid operated fluid valve is actuated at a duty cycle determined in accordance with a predefined schedule designed to produce a progressively increasing fluid pressure differential across said clutch plate;

indicating unsuccessful TCC engagement if a predefined speed relationship across said fluid coupling is not achieved after said pressure control mode has been established for at least a predetermined interval;

establishing a flow control mode in place of said pressure control mode in response to said indication of unsuccessful TCC engagement, wherein said solenoid operated fluid valve is actuated at a duty cycle which provides substantially full exhaust of fluid from said release chamber, thereby to initiate engagement of said clutch;

indicating successful TCC engagement in response to the occurrence of a predefined change in the speed relationship across said fluid coupling during the establishment of said flow control mode; and re-establishing said pressure control mode in place of said flow control mode in response to said indication of successful TCC engagement, thereby to complete the engagement of said clutch plate in accordance with said predefined schedule.

2. The control method set forth in claim 1, wherein the step of indicating successful TCC engagement during the establishment of said flow control mode includes the steps of:

measuring an initial speed relationship of said fluid coupling at the establishment of said flow control mode;

periodically measuring said speed relationship after the establishment of said flow control mode; and indicating successful TCC engagement when the periodically measured speed relationship deviates from said initial speed relationship by a predetermined amount.

3. The control method set forth in claim 1, wherein: the duty cycle determined during said pressure control mode is determined as a function of an elapsed time indication initiated with the production of said signal commanding engagement of the TCC; and said elapsed time indication is reset to a predetermined value upon said re-establishing of said pressure control mode to re-establish said pressure control mode.

4. The control method set forth in claim 1, including the step of:

independently re-establishing said pressure control mode after said flow control mode has been established for at least a predetermined time interval.

5. The control method set forth in claim 1, wherein the duty cycle of actuation during said flow control mode is determined in relation to an indication of the torque developed by said engine.

6. The control method set forth in claim 1, wherein the step of indicating unsuccessful TCC engagement includes the step of:

monitoring the rate of change of said predefined speed relationship; and indicating unsuccessful TCC engagement if the monitored rate of change is less than a threshold rate of change representative of successful TCC engagement.

* * * * *